G. H. & C. C. WILLIAMS.
HOISTING APPARATUS.
APPLICATION FILED MAY 11, 1914.
1,178,693.
Patented Apr. 11, 1916.
2 SHEETS—SHEET 1.
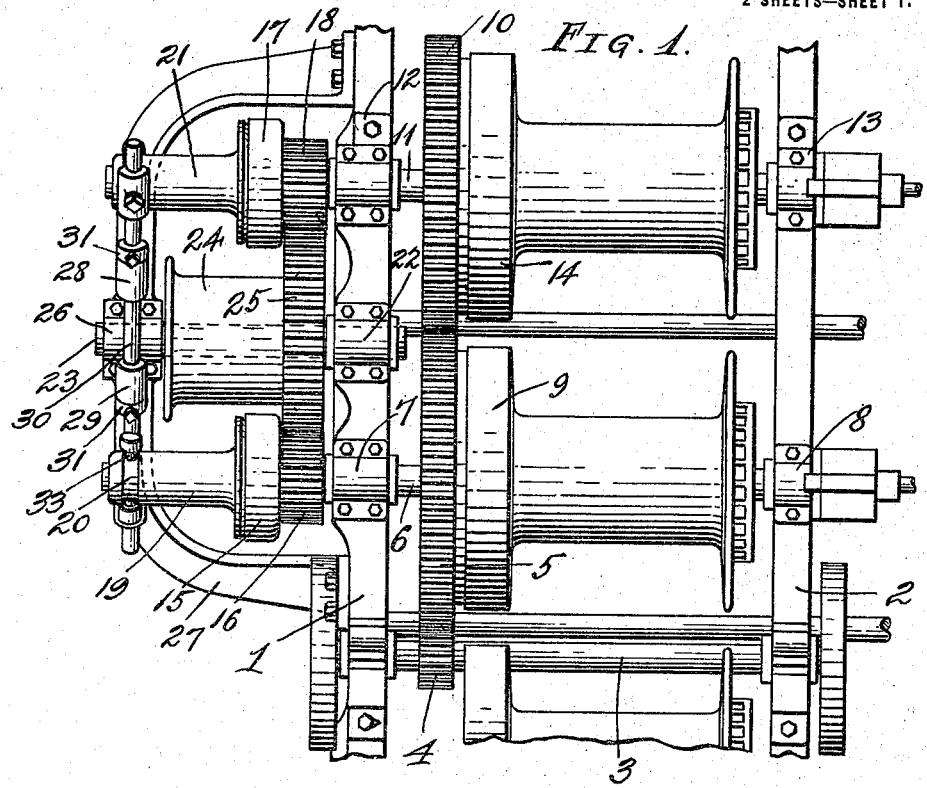
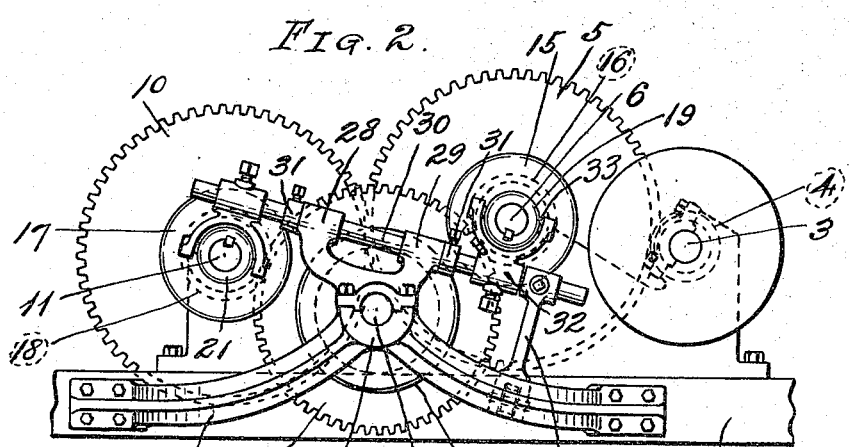
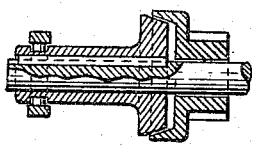
Witnesses:
A. L. Lord
C. H. Tresch
Inventors
Gurdon H. Williams
Charles C. Williams
by B. W. Brockett
Atty.

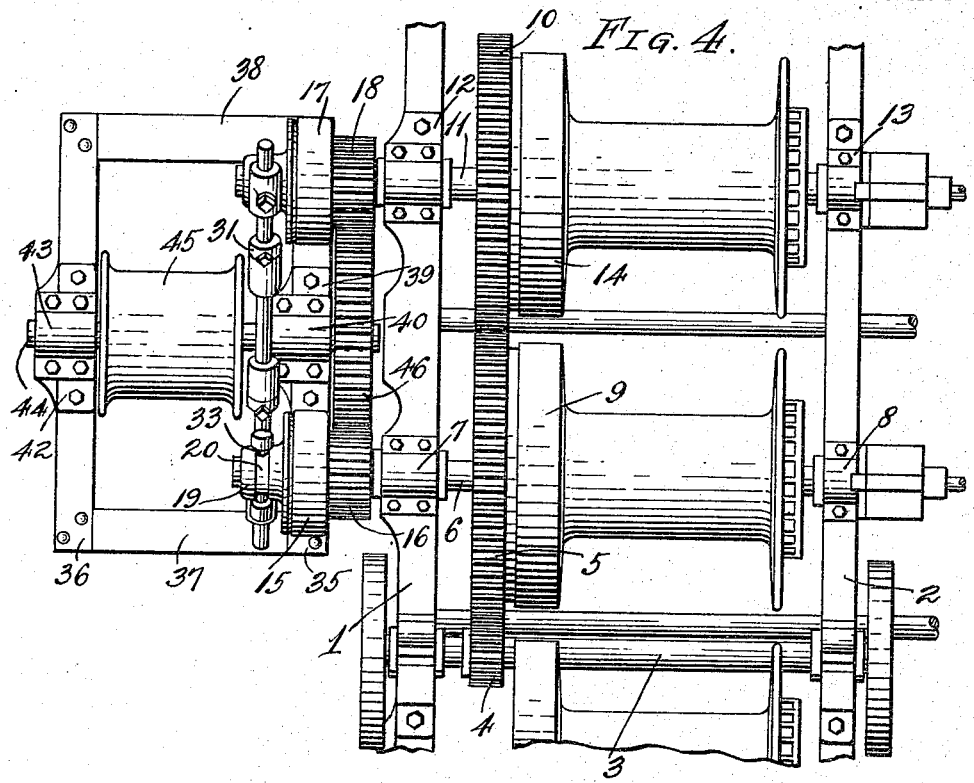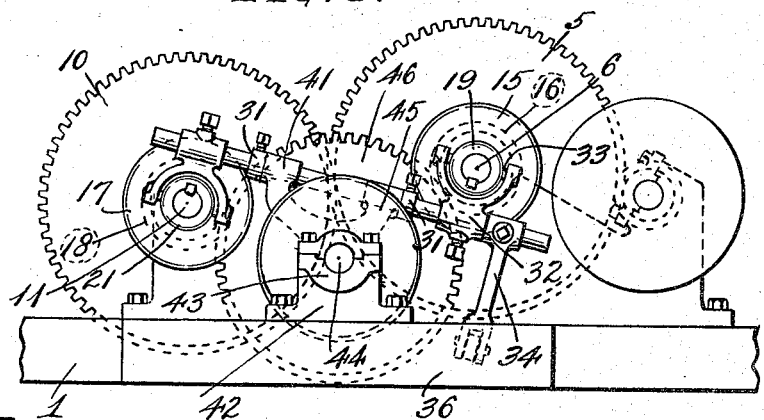

UNITED STATES PATENT OFFICE.

GURDON H. WILLIAMS AND CHARLE C. WILLIAMS, OF CLEVELAND, OHIO.

HOISTING APPARATUS.

1,178,693.  Specification of Letters Patent.  Patented Apr. 11, 1916.

Application filed May 11, 1914. Serial No. 837,784.

*To all whom it may concern:*

Be it known that we, GURDON H. WILLIAMS and CHARLE C. WILLIAMS, citizens of the United States, residing at Cleveland, in the county of Cuyahoga and State of Ohio, have invented certain new and useful Improvements in Hoisting Apparatus, of which the following is a specification.

This invention relates generally to hoisting and conveying machinery and particularly to a hoisting drum structure including suitable clutch mechanism for connecting the drum properly with either of two oppositely rotating elements.

More specifically the invention relates to a suitable hoisting drum structure comprising a drum operatively connected to a gear in turn meshing with a pair of gears or pinions mounted upon shafts which rotate in opposite directions and which may be coupled to the gears or pinions by suitable clutch mechanism.

The invention may be further briefly summarized as consisting in the construction and combination of parts hereinafter set forth in the following description, drawings and claims.

Referring to the drawings, Figure 1 is a plan view of our device; Fig. 2 is a side elevation; Fig. 3 is a sectional view through one of the clutches and portion of the shaft upon which it is mounted; Fig. 4 is a top plan view of a modified form; and Fig. 5 is a side elevation of this form.

In carrying out the invention any preferred form and construction of parts may be employed so long as they possess the necessary characteristics, but we have shown one arrangement in the drawings which is effective in operation, and in such embodiment, the frame members 1 and 2 support a main driving shaft 3 which may form the crank shaft of an engine or may be a power shaft to be driven in any suitable manner. This shaft 3 is provided with a driving pinion 4 meshing with a drum driving gear 5 mounted upon a shaft 6 supported in bearings 7 and 8 in the frame members 1 and 2. This drum driving gear 5 and the shaft 6 support a drum 9 operated from these parts in any suitable manner. Since this structure forms no part of the invention it therefore needs no further description. The drum driving gear 5 also meshes with a drum driving gear 10 supported upon a second drum shaft 11 mounted in bearings 12 and 13 carried by the frame members. This gear 10 and shaft 11 coöperate to drive a suitable drum 14 arranged between the side frame members. The structure so far is well known in the art, and it only enters into the combination in that it provides two driving shafts 6 and 11 having opposite directions of rotation for operating another drum mechanism which will now be described.

The shafts 6 and 11 are extended well beyond the frame, and the former is provided with a cone clutch member 15 rotatably mounted upon the shaft and provided with a driving pinion or gear 16. In like manner the shaft 11 is provided with a cone clutch member 17 having a driving pinion or gear 18. Slidably mounted upon the shaft 6 but loosely splined thereto is a clutch member 19 provided with an annular groove 20 while the shaft 11 is provided with a clutch member 21 also provided with a groove similar to the cam groove 20.

Supported upon the side frame member 1, in a bearing 22, is an auxiliary drum driving shaft 23 carrying an auxiliary drum 24 provided with a driving gear 25 meshing with the two driving pinions or gears 16 and 18. The end of the shaft 23 is supported in a bearing 26 carried by a bearing bracket 27 secured to the side frame member 1. This bearing bracket 27 is provided with two clutch rod bearings 28 and 29, the openings of which are in alinement and are arranged so that the clutch shifting rod 30 extends above the shaft 11 and below the shaft 6, as shown in Fig. 2. This clutch shifting rod 20 is provided with suitable collars 31 for preventing longitudinal movement in its bearings, and adjacent to the clutch member 20 is provided with a clutch shifting fork member 32 having suitable pins 33 engaging in the groove 20. In like manner the opposite end of the clutch shifting rod 30 is provided with a clutch shifting fork member the pins of which engage in the groove in the clutch member 21. This clutch shifting rod 30 may be operated by a suitable lever 34 or by any other suitable mechanism.

Assuming that power is transmitted in some manner to the shaft 3, the gears 5 and 10 will be driven, and by these gears the shafts 6 and 11 will be rotated in opposite directions, the respective rotations of these shafts being transferred to their respective clutch members 19 and 21 mounted upon the ends of these shafts. When the operator desires to have the auxiliary drum idle he causes the clutch shifting rod 30 to move the clutch shifting fork members into a neutral position, so that both clutch members 19 and 21 are out of engagement with their clutch members 15 and 17, and rotation of the clutch shifting rod from this position causing one or the other of the clutch members to be brought into engagement and the auxiliary drum to be driven therefrom.

In the modification shown in Figs. 4 and 5 an auxiliary supporting frame is provided, and this frame comprises side members 35 and 36 held together by suitable end members 37 and 38. The side member 35 is provided with a bearing bracket 39 having at the upper end thereof a suitable bearing 40 carrying a shifting rod bearing bracket 41 for supporting the shifting rod in a manner similar to the other construction. The side member 36 is provided with a suitable bracket 42 carrying an auxiliary shaft bearing 43. These bearings 40 and 43 support an auxiliary drum shaft 44 provided with a drum 45, and between the auxiliary frame member 35 and the main frame member 1 with a driving gear 46 adapted to mesh with the pinions or gears 16 and 18. In this form, the clutches are operated in substantially the same manner as in the form already described.

Having described our invention, we claim:—

1. In hoisting apparatus, a main frame, a pair of hoisting drum shafts mounted in said frame and extending beyond one side thereof, hoisting drums mounted upon said shafts within the frame, means for driving said shafts in opposite directions, an auxiliary frame secured to the main frame on the side from which said drum shafts extend, an auxiliary drum mounted in the main frame and in the auxiliary frame, suitable gearing between said auxiliary drum and the oppositely driven drum shafts extending from the main frame and including clutch mechanism for bringing about the coupling of the gearing to either one or the other of the oppositely driven shafts, and means for actuating said clutch mechanism.

2. In hoisting apparatus, a main frame, a pair of hoisting drum shafts mounted in said frame and extending beyond one side thereof, hoisting drums mounted upon said shafts within the frame, means for driving said shafts in opposite directions, an auxiliary frame secured to the main frame on the side from which said drum shafts extend, an auxiliary drum mounted in the main frame and in the auxiliary frame, a gear connected to the auxiliary drum, a driving pinion loosely mounted upon each of the oppositely driven drum shafts and meshing with the auxiliary drum gear, clutch mechanism arranged between each driving pinion and its corresponding shaft, and means for actuating said clutches.

3. In hoisting apparatus, a main frame comprising two side members, a pair of hoisting drum shafts mounted between said members, hoisting drums upon said shafts, means for driving said drum shafts in opposite directions, an auxiliary frame to one side of the main frame, an auxiliary drum shaft mounted in said auxiliary frame, an auxiliary drum mounted upon said auxiliary drum shaft, a driving gear connected to said auxiliary drum, a pair of driving pinions loosely mounted upon the hoisting drum shafts and meshing with the auxiliary drum gear, a clutch member carried by each pinion, clutch members loosely splined on the two hoisting drum shafts, and mechanism for operating the slidable clutch members and comprising a rod extending diagonally between said shafts, a pair of clutch throwing arms carried by said rod one for each of the slidable clutch members, and rocking means for said rod.

In testimony whereof we affix our signatures in presence of two witnesses as follows.

GURDON H. WILLIAMS.
CHARLĔ C. WILLIAMS.

Witnesses:
 ANNA B. CULLEN,
 E. P. LORD.

Copies of this patent may be obtained for five cents each, by addressing the "Commissioner of Patents, Washington, D. C."